United States Patent [19]

Becker

[11] 4,204,021
[45] May 20, 1980

[54] ARTICLE OF MANUFACTURE HAVING COMPOSITE LAYER AFFORDING ABRASION RESISTANT AND RELEASE PROPERTIES

[75] Inventor: Gordon P. Becker, Broadview Heights, Ohio

[73] Assignee: Ferro Corporation, Cleveland, Ohio

[21] Appl. No.: 972,708

[22] Filed: Dec. 26, 1978

[51] Int. Cl.² ............... B32B 27/00; B32B 9/06; B32B 15/04; B05D 1/36
[52] U.S. Cl. ............... 428/325; 427/193; 427/203; 427/204; 427/247; 427/409; 427/387; 428/339; 428/421; 428/447; 428/450
[58] Field of Search ............ 220/64; 427/387, 388 A, 427/407 R, 409, 193, 203, 204, 205, 247; 428/35, 447, 422, 448, 421, 450, 457, 325, 339

[56] References Cited

U.S. PATENT DOCUMENTS

| | | | |
|---|---|---|---|
| 3,697,309 | 10/1972 | Werner | 427/409 X |
| 3,840,394 | 10/1974 | Eppler | 427/193 X |
| 4,028,339 | 6/1977 | Merrill | 428/450 X |
| 4,066,817 | 1/1978 | DeRossi | 428/450 X |
| 4,118,537 | 10/1978 | Varg et al. | 427/409 X |

Primary Examiner—Michael R. Lusignan
Attorney, Agent, or Firm—Wilson, Fraser, Barker & Clemens

[57] ABSTRACT

An article of manufacture, such as cookware, having a composite layer adhered thereto and a process for forming it are disclosed, characterized in that the layer is a porous ceramic body having a continuous, communicating pore structure, and a film-forming, polymerized organic resinous impregnant, such as a silicone compound, fills at least some of the pores. The impregnant is adapted to serve as a release agent. As a result, the article acquires a composite layer having at least the abrasion resistance of the ceramic and the release properties of the resinous impregnant.

22 Claims, 3 Drawing Figures

ARTICLE OF MANUFACTURE HAVING COMPOSITE LAYER AFFORDING ABRASION RESISTANT AND RELEASE PROPERTIES

BACKGROUND OF THE INVENTION

It has been the practice to provide ceramic coats on various cookware such as pots, pans, and the like, and particularly aluminum based cookware. Normally, ceramic and ceramic clad surfaces have poor release properties because of their inherently high surface energies. Food residues, and especially those formed after cooking, tend to adhere with some tenacity to ceramic and ceramic clad surfaces. At the same time, organic coatings commonly used on cookware suffer from poor abrasion resistance and hardness, expecially when hot. Cookware is often subject to wear due principally to abrasion against other parts while in use, such as cooking utensils.

Various approaches have been taken in the past to improve both the release properties and abrasion resistance of cookware and the like. One approach included applying a discontinuous coating on a substrate that amounted to a series of glassy, spaced-apart minute lumps on the substrate around and over which a release coating was deposited. In terms of volume, the release coating predominated over the glassy lumps. While the lumps afforded some abrasion protection to the release coating as from scraping by a cooking utensil, the protection was incomplete and the release coating tended to be substantially unprotected and had a relatively short useful life.

The present invention improves cookware and other suitable substrates in need of such protection by forming a composite layer over the substrate that has effectively both improved abrasion-resistant and release properties as well as an improved adherence to the substrate by physically interlocking with it.

SUMMARY OF THE INVENTION

The principal object of the present invention is to provide a substrate with a composite layer having improved abrasion-resistant and release properties. The composite layer exhibits a true synergistic effect through the formation of a combination of a ceramic with a resinous material of low surface energy. The average surface energy of the composite layer is then an average of the surface energies of the two phases, that is, of the ceramic and resinous phases.

In carrying out the invention, a porous ceramic body is initially formed and adhered to the substrate. It is necessary that the pore structure be a continuous, communicating one. The pores of the ceramic body are then at least partially filled with a film-forming, polymerizable, organic resinous impregnant which is polymerized in situ, as by heat. Various resinous impregnants may be used that have relatively low coefficience of friction, such as those of polymerizable silicone resins, polyphenyl sulfide, and fluorinated polyalkylenes. Preferably, the impregnant completely fills the pores of the ceramic body and extends over the exposed surface of the layer completely to cover the ceramic body.

The abrasion resistance of the composite layer is derived from the ceramic body or matrix and is greater than that for the porous ceramic body alone. In the composite layer, the ceramic body is supported by the hardened impregnant in its pores. Thus, the abrasion resistance of the layer approaches that of a comparable, continuous ceramic surface, while the presence of the impregnant provides release properties which negate a tight adherence of cooked food deposits and the like to the ceramic body.

DESCRIPTION OF THE PREFERRED EMBODIMENTS

Figure 1:
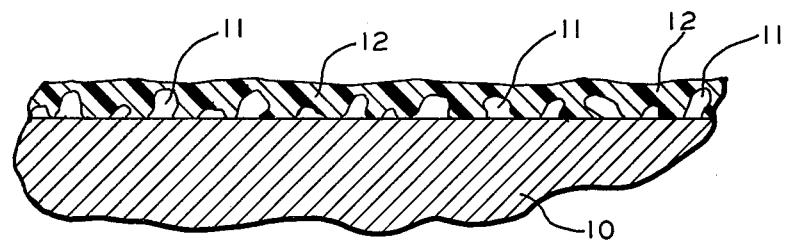
FIG. 1 is a semi-schematic, enlarged, cross-sectional view of a substrate having a protective layer provided in accordance with prior art.

The composite layer contemplated by the present invention represents a significant departure from prior practice in coating cookware and the like. In one prior technique a discontinuous coating of glassy chunks or lumps was deposited on a substrate and then surrounded with a release coating. FIG. 1 illustrates such a technique. A metallic substrate 10 has adhered to it a series of irregularly shaped glass lumps 11 which are spaced along the substrate free of direct contact with each other. A release coating 12 is applied over lumps 11 to encase them and provide a generally uniform layer on the substrate 10. Lumps 11 afford some protection to substrate 10 against scraping and the like, but the protection is incomplete due to the relative spacing and comparative small amount of the lumps. Also, release coating 12 which predominates in amount over the glassy lumps 11 is, itself, unprotected and subject to wear, resulting in a relatively short useful life.

In accordance with the present invention, a porous ceramic body or matrix is initially formed on a substrate and then impregnated with a film-forming, polymerizable, organic resinous impregnant which is polymerized in situ to serve as a release agent. The resulting composite layer thus formed has the abrasion resistance of the ceramic body and the release properties of the impregnating resin.

Figure 2:
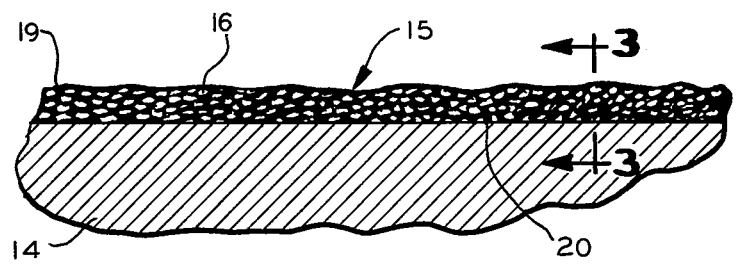
FIG. 2 is a semi-schematic, enlarged, cross-sectional view of a substrate having a composite layer produced in accordance with the present invention.
Figure 3:
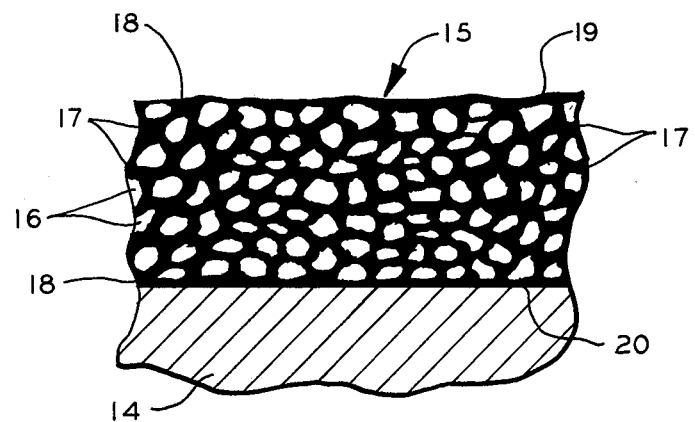
FIG. 3 is a cross-section of FIG. 2 on the line 3—3.

FIGS. 2 and 3 illustrate a substrate and composite layer of the present invention. In this case, a substrate 14 carries a composite layer, generally represented at 15, which comprises a porous ceramic body 16 so formed as to have a continuous, communicating pore structure represented at 17. A film-forming, polymerized, organic, resinous impregnant 18 fills at least some and preferably all of the pores. It is also preferred that an excess of impregnant 18 extends over the exposed surface of layer 15 completely to cover the ceramic body and form a continuous, relatively thin skin 19 of the impregnant. The skin improves upon the release properties of layer 15 without sacrificing any abrasion resistance.

Preferably, but not necessarily, glass particles having a much lower melting point than the ceramic used is mixed with ceramic particles prior to their application to substrate 14 and formation of the ceramic body. Upon the application of heat and fusing, the glass particles not only help to bind the ceramic particles one to another to form ceramic body 16 but serve to bind the resulting porous body to substrate 14. This is represented in FIGS. 2 and 3 by a sealant film 20 formed from the glass particles at the interface between porous body 16 and substrate 14. Thus the ceramic particles and the impregnant of the entire mass of composite layer 15 are fixed relatively to each other and interlocked with substrate 14.

Considering these components in greater detail, substrate 14 may be any semi-rigid or rigid support, although it is usually metal such as those normally employed to fabricate cookware, such as pots and pans. For example, iron, iron alloys, copper, and copper alloys may be used. Aluminum is preferred. However, the substrate may be glass, such as the low expansion, Pyrex type of glass bakeware.

The composition of the porous ceramic body is not at all critical. However, it is important that the ceramic body have a continuous, communicating pore structure to enable the impregnant substantially to reach all open portions of the pore network. By "communicating" is meant that the pores are substantially open to other adjacent pores and are not closed or isolated. It will be appreciated that some pores may be closed but that in the main the porous structure is appreciably open that the impregnant may flow and reach substantially throughout the porous ceramic body during the impregnating step.

The best mode of fabricating a ceramic body having the open porous network is to sinter together directly on a substrate ceramic particles in combination with a fritted vitreous binder having a relatively low fusion temperature. During the sintering, the ceramic particles remain substantially in contact and are bound together and to the substrate by the vitreous binder which fuses and then solidifies upon cooling. The amount of binder used is controlled so that it cannot fill all of the voids of the porous body which results from the sintering and thereby insure the existence of an open pore network.

By "ceramic particles" is meant both vitreous and crystalline particles which are non-metallic and inorganic and which have fusing temperatures above the eventual temperature of use of the substrate being coated, as in cookware or the like. Thus, the ceramic particles can be those of silicon carbide, alumina, silica, zirconia, magnesia, as well as particles of vitreous, amorphous glasses which have sufficiently high fusing temperatures as indicated and which form pores when fired to a fluid condition and then cooled. If desired, the ceramic particles may include metallic components as illustrated by Example 2, such that the porous ceramic body contains the metallic components as well.

The glass particles which serve to bind the ceramic particles are amorphous and should also have fusion temperatures above the eventual temperature of use of the coated substrate, as in cookware or the like. However, the fusion temperature of the glass particles forming the binder should be below that of the ceramic particles, so that the glass particles can fuse and flow about the ceramic particles and later solidify upon cooling to bind the ceramic particles together and to the substrate. Many fritted glass compositions can be used for this purpose. The composition of the binder glass is not at all critical as long as the fusion temperature requirements as described are observed. The binder glass should be present in an amount to bind the ceramic particles without substantially blocking the open, communicating pore structure. As a rule, the binder glass is used in an amount of about 4% to about 65% by weight of the ceramic particles.

In general, the pores formed have an average diameter within the range of about 0.0010 inch to about 0.0025 inch. At diameters above the higher value, the grains or particles around the pores are too large to produce a sufficiently smooth coating. The pores may comprise from about 15% to about 55% by volume of the ceramic body and preferably from about 22% to about 42%. If desired, the porous ceramic coat may actually comprise two coats, that is, a base coat which adheres to the substrate and a top coat which adheres to the base coat.

After adhering a porous ceramic body to a substrate, the organic resinous impregnant having the desired release properties at least partially fills the pores of the body and then hardens in place. The impregnant may comprise various organic resins having sufficiently low surface energy and these properties:

A. Be film forming,
B. Polymerizable in situ, and
C. Preferably have thermal stability up to relatively high temperatures, such as up to about 500° F.

Among those materials suitable as impregnants and which have the desired properties are polyphenyl sulfide, fluorinated polyalkylenes such as polytetrafluoroethylene, and silicone polymers. U.S. Pat. No. 3,726,710 to Berger et al, which is hereby incorporated by reference, discloses one class of silicone polymers which have good release properties and are useful in accordance with the present invention. Such silicone polymers are organopolysiloxane compounds which are cross-linkable and have the average formula:

in which each R is individually an unsubstituted monovalent hydrocarbon radical having from 1 to 20 carbon atoms, or a substituted monovalent hydrocarbon radical having from 1 to 20 carbon atoms wherein the substituents are selected from the class consisting of chloro, fluoro, cyano, amino, amido, nitro, ureido, isocyanato mercapto, alkoxy, acryloyl, methacryloyl, and the like; n has an average value from about 1.8 to about 2.2; and in which x has an average value greater than 2; the organopolysiloxane having an average of at least an average of at least two pendant silicon bonded olefinic siloxy units, that is, R(X)SiO units in which X is an olefinic radical, per polymer molecule.

More particularly, illustrative of such organopolysiloxane starting materials are those fluid polymers having a viscosity of about 100 centipoises to about 1,000,000 centipoises at 25° C. which contain an average of at least two vinyl siloxy units per polymer molecule, such as MeViSiO, EtViSiO, Vi$_2$SiO and the like and which can also contain one or more organosiloxy units such as Me$_2$SiO, Et$_2$SiO, MeEtSiO, Me$\phi$SiO, MeC$_8$H$_{17}$SiO, MeHSiO, (C$_8$H$_{17}$)$_2$SiO, $\phi_7$SiO, Me($\phi$CH$_2$)SiO, CH$_3\phi$MeSiO, Me$_3$SiO, Et$_3$SiO, HO(Me)$_2$SiO, (CH$_3$O)(Me)$_2$SiO, C/(Me)SiO and the like, in which Me represents a methyl radical, Et represents an ethyl radical, $\phi$ represents a phenyl radical, and Vi represents a vinyl radical (—CH$_2$=CH).

As described in U.S. Pat. No. 3,726,710, the disclosed organopolysiloxane compounds can be cured by admixing them with a photosensitizing amount of a photosensitizer. After impregnating a porous ceramic body with such admixture, the assembly is exposed to a continum light radiation source. Any known photosensitizer can be used which can absorb light energy, pass temporarily to an excited state and, while in the excited state, transfer its energy to another compound and return to its original unexcited state. Specific examples of photosensitizers include acetophenone, propiophenone, benzophenone, benzaldehyde, anthraquinone, and still others known in the art. Preferably, the light radiation employed emits a high intensity and predominately continuum light radiation containing ultraviolet, visible and infrared radiation to crosslink the polysiloxane compound and convert it to a solid state.

A preferred silicone polymer useful in the invention is a copolymer of a silicone compound containing an silanol group and a polyester resin. Desirably, the silicone polymer is a polysiloxane that is liquid at room temperatures and a polyester resin formed from a polyol of 2 to about 10 carbon atoms and a dicarboxylic acid of 2 to about 10 carbon atoms. The preferred polyester resin is an unsaturated, thermosetting, cross-linked alkyd resin.

The silicone compound which copolymerizes with the polyester resin must have a reactive, condensable silonol, $\equiv$SiOH, group. Accordingly, hydroxysilanes, including hydroxy alkoxy silanes and preferably hydroxy dialkyl polysiloxanes and hydroxy alkylphenyl polysiloxanes, the polysiloxanes being hydroxy endblocked and liquid at room temperatues, are suitable for the copolymerization reaction. The liquid silicone compounds or liquids containing them may have viscosities ranging from about 100 to about 100,000 centipoises at 25° C. For example, the polysiloxane may be dimethylpolysiloxane or methylphenylpolysiloxane having terminal hydroxy groups. One example of a silicone-polyester-copolymer that may be used is that sold by General Electric under the trade designation SR119.

The polyols that may be used in forming the polyester resins may comprise ethylene glycol, propylene glycol, butylene glycol, trimethylene glycol, diethylene glycol, triethylene glycol, dipropylene glycol, hexylene glycol, glycerine, and the like. Saturated dicarboxylic acids may be used, such as phthalic acid, terephthalic acid, isophthalic acid, adipic acid, succinic acid, pimelic acid, glutaric acid, suberic acid, sebacic acid, azelaic acid, anhydrides thereof, and the like. Unsaturated dicarboxylic acids are preferred to render the polyester cross-linkable, such as maleic acid, ethylmaleic acid, diethyl maleic acid, itaconic acid, fumaric acid, chlorofumaric acid, citraconic acid, anhydrides thereof and the like. For cross-linked polyesters, a vinyl-containing cross-linking agent such as styrene is normally present in the reaction mixture. The temperatures, catalyst, proportions used, and other conditions of reaction to form these polyester resins are well known in the art.

The hydroxyl group of the silicone reactant is thought to react with a hydroxyl group (splitting off water) or with an unsaturated carbon-to-carbon double bond on the polyester to form the copolymer. Without intending to limit the invention, the following are molecular moieties illustrating the type of resulting linkage between the copolymerizing silicone compound and the polyester reactant:

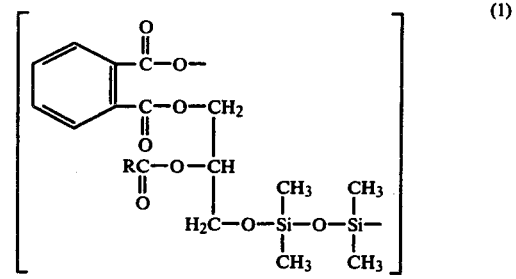

Similarly, a linkage formed by reacting a lower alkyl (that is, up to about 5 carbon atoms) trialkoxy silane and a lower alkyl diester of glycerine may be represented as follows:

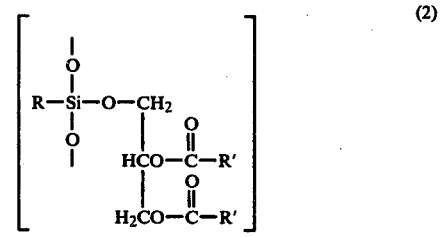

in which R represents lower alkyl of the silane and R' represents lower alkyl of the esterification. Each of R and the two R' substituents can be the same or different and, indeed, represent still other substituents.

The silicone-polyester copolymer is incompletely cured prior to impregnation of the ceramic body and then fully cured in situ by the application of heat. If sufficiently fluid (as in a low state of copolymerization) the copolymer can be applied to the ceramic body without dilution. However, dilution with a suitable, nonreactive, organic solvent is normally made to about 15% to about 25% by weight solids. Such a solvent may include xylol, butanol, and the like.

Silicone polyester copolymerization of the type described takes place at relatively low temperatures, for example at about 350° F. to about 500° F. in about 10 to about 60 minutes. Although not critical, a catalytic amount of a metal salt of a carboxylic acid is normally included to accelerate the copolymerization. For instance, from about 0.05% to about 2.0% by weight of a metallic octoate can be used such as cobalt octoate.

The impregnant or release agent may be impregnated into pores of the ceramic body or matrix by any convenient technique. Capillary action may be used and induced by wetting agents known in the art, or impregnation may be carried out by mechanically or chemically induced differential gas pressure within the pore structure as in a vacuum or pressure tank. It is preferred to add the impregnant by flow coating it over the ceramic body and allowing it to sink or penetrate into the pores of the body. In the best mode of the invention, the impregnant completely fills the pores and an excess of the impregnant forms a skin over the top of the ceramic body. However, this is not necessary. In general, the impregnant may comprise about 5% to about 55% by volume of the ceramic body. Following the impregnation, the organic resin is polymerized in situ as by heat to a solid state.

The following examples only illustrate the invention and should not be construed as imposing limitations upon the claims.

EXAMPLE 1

A frit was used to prepare a base coat for an aluminum panel. The frit had the following composition in weight percent.

|  |  |
|---|---|
| SnO | 2.37 |
| BaO | 2.87 |
| $B_2O_3$ | 1.32 |
| CaO | 0.94 |
| CuO | 0.46 |
| $K_2O$ | 11.67 |
| $Li_2O$ | 5.56 |
| $Na_2O$ | 15.74 |
| $P_2O_5$ | 1.42 |
| $SiO_2$ | 39.44 |
| $TiO_2$ | 18.21 |
|  | 100.00 |

The base coat mill additions comprised the following in parts by weight:

| Base Coat Mill Additions |  |
|---|---|
| Frit | 90.0 |
| $SiO_2$ (pass 325 mesh) | 10.0 |
| Potassium Silicate | 9.9 |
| Potassium Hydroxide | 2.2 |
| Boric Acid | 1.25 |
| Colloidal Silica | 0.83 |
| Potassium Carbonate | 0.83 |
| Cobalt Pigment | 10.0 |
| Potassium Nitrate | 0.1 |
| Water | 45.0 |

Top coat mill additions comprised the following in parts by weight:

| Top Coat Mill Additions |  |
|---|---|
| $SiO_2$ (pass 200 mesh) | 150.0 |
| Sodium Silicate | 16.1 |
| Potassium Hydroxide | 6.6 |
| Boric Acid | 7.2 |
| Water | 75.0 |

The base coat was ground in a ball mill until 0.1 to 0.2 gm. was retained on a 325 mesh screen from a 50 cubic centimeter sample. The top coat was blunged in a mixer until homogeneous. Both top coat and base coat were screened thru a 100 mesh screen prior to use to eliminate agglomerated and coarse particles.

The base coat was sprayed on an aluminum panel at the rate of 24 grams per square foot and then fired at 1000° F. for six minutes. The aluminum panel comprised a 3003 alloy and was about 0.05 inch thick. The top coat was then sprayed over the final base coat at 24 grams per square foot and fired at 1000° F. for six minutes. The resulting coating was hard and porous and tightly adherent to the aluminum substrate.

The porous surface thus obtained was flow-coated with a silicone-polyester copolymer of the type described and sold by General Electric under the trade designation, SR119. It was applied as a solution in a 70/30 parts blend of xylol and butanol, respectively, having a 25% by weight solids content. This fluid had sufficiently low viscosity that it readily entered the pores of the ceramic coat by the flow coating in combination with capillary action. The assembly was then heated at 480° F. for 15 minutes to harden the silicone copolymer to a solid state.

The resulting surface caused water to bead on it, whereas water flows out on a similar surface untreated with the silicone polymer. The resulting surface also exhibited good resistance to abrasion.

EXAMPLE 2

The same frit composition as described in Example 1 was used to prepare the base coat for an aluminum panel.

The base coat mill additions comprised the following in parts by weight:

| Base Coat Mill Additions |  |
|---|---|
| Frit | 100.0 |
| Sodium Silicate | 5.4 |
| Boric Acid | 2.4 |
| Potassium Hydroxide | 2.2 |
| Pigment | 10.0 |
| Potassium Nitrate | 0.1 |
| Water | 45.0 |

The pigment in the mill additions was an inorganic color pigment made from cobalt, iron and chrome having a specific gravity of 5.15, and an average particle size of 0.75 microns.

Top coat mill additions comprised the following in parts by weight:

| Top Coat Mill Additions |  |
|---|---|
| Base Coat | 100.0 |
| Sodium Silicate | 10.8 |
| Potassium Hydroxide | 4.4 |
| Boric Acid | 4.8 |
| 200 mesh Silica | 100.0 |
| 200 mesh Aluminum Powder | 50.0 |
| Water | 75.0 |

The base coat was ground in ball mill until 0.1 to 0.2 gram was retained on a 325 mesh screen from a 50 cubic centimeter sample. The top coat composition was mixed in a mixer until homogeneous so that no grinding takes place. Both the top coat and base coat compositions were screened through a 100 mesh screen prior to application. The base coat mill additions were adjusted to a specific gravity of 1.7 grams per cubic centimeter by adding water and then sprayed to apply six grams per square foot on an aluminum alloy substrate known in the art as alloy 3003. The top coat was then sprayed at a rate of 18 grams per square foot directly over the base coat. The substrate and base and top coat applications were then fired at 1000° F. for 10 to 15 minutes. A technique of a two coat, one-fire application of relatively dry dual coats is described and claimed in U.S. Pat. No. 4,110,487 to Rion. The resulting coating of this example was smooth, uniform, porous and tightly adherent to the aluminum substrate.

As in Example 1, an organic solvent solution of 25% solids of a silicone-polyester copolymer, General Electric SR119, was flow coated over the resulting porous ceramic body. The impregnant substantially filled the pores of the body. Heating at 480° F. for about 15 minutes converted the copolymer to a solid state.

Although the foregoing describes several embodiments of the present invention, it is understood that the invention may be practiced in still other forms within the scope of the following claims.

I claim:

1. A substrate having a composite layer adhered thereto providing improved abrasion-resistant and release properties, said composite layer comprising a porous ceramic body having a continuous, communicating pore structure, and a film-forming, polymerized, organic resinous impregnant filling pores of said body selected from the group consisting of silicone polymers, polyphenyl sulfide, and fluorinated polyalkylenes, said impregnant being adapted to serve as a release agent, and said composite layer having at least the abrasion resistance of the ceramic and the release properties of the impregnant.

2. The substrate and composite layer of claim 1 in which said substrate is aluminum.

3. The substrate and composite layer of claim 1 in which the pores of said porous body have an average diameter within the range of about 0.0010 inch to about 0.0025 inch.

4. The substrate and composite layer of claim 1 in which said ceramic body comprises ceramic particles bound one to another by glass, said glass also adhering the resulting ceramic body to said substrate.

5. The substrate and composite layer of claim 1 in which said resinous impregnant fills the pores of said ceramic body and extends over the exposed surface of said layer completely to cover said ceramic body.

6. The substrate and composite layer of claim 1 in which said resinous impregnant is polytetrafluoroethylene.

7. The substrate and composite layer of claim 1 in which said resinous impregnant is a copolymer of a silicone compound containing a silanol group and a polyester resin.

8. The substrate and composite layer of claim 1 in which said resinous impregnant is a copolymer of a polyalkylsiloxane that is liquid at room temperatures and a polyester resin formed from a polyol of 2 to about 10 carbon atoms and a dicarboxylic acid of 2 to about 10 carbon atoms.

9. The substrate and composite layer of claim 1 in which said resinous impregnant is a copolymer of a polyalkylsiloxane that is liquid at room temperature and an unsaturated, thermosetting, cross-linked alkyd resin.

10. The substrate and composite layer of claim 1 in which said porous body contains about 15% to about 55% by volume of said pores.

11. The substrate and composite layer of claim 1 in which said porous body contains about 5% to about 55% by volume of said impregnant.

12. A process of coating a substrate with a composite layer providing improved abrasion-resistant and release properties, said process comprising adhering to the substrate a porous ceramic body having a continuous, communicating pore structure, impregnating pores of said body with a film-forming, polymerizable, organic resinous impregnant selected from the group consisting of silicone polymers, polyphenyl sulfide, and fluorinated polyalkylenes, and heating the assembly to polymerize the impregnant to a solid form, said impregnant being adapted to serve as a release agent, and said composite layer having at least the abrasion resistance of the ceramic and the release properties of the impregnant.

13. The process of claim 12 in which said substrate is aluminum.

14. The process of claim 12 in which said forming a porous ceramic body includes forming pores having an average diameter within the range of about 0.0010 inch to about 0.0025 inch.

15. The process of claim 12 in which said applying to the substrate of a porous ceramic body comprises applying a mixture of ceramic particles and a glass frit, heating to fuse the glass frit and bind the ceramic particles one to another and to adhere the resulting porous ceramic body to said substrate.

16. The process of claim 12 including filling the pores of said ceramic body with said impregnant and extending the impregnant over the exposed surface of said layer completely to cover said ceramic body.

17. The process of claim 12 in which from about 5% to about 55% by volume of said ceramic body is impregnated with said impregnant.

18. The process of claim 12 in which said porous body contains about 15% to about 55% by volume of said pores.

19. The process of claim 12 in which said resinous impregnant is polytetrafluorethylene.

20. The process of claim 12 in which said resinous impregnant is a copolymer of a silicone compound containing a silonol group and a polyester resin.

21. The process of claim 12 in which said resinous impregnant is a copolymer of a polyalkylsiloxane that is liquid at room temperatures and a polyester resin formed from a polyol of 2 to about 10 carbon atoms and a dicarboxylic acid of 2 to about 10 carbon atoms.

22. The process of claim 12 in which said resinous impregnant is a copolymer of a polyalkylsiloxane that is liquid at room temperatures and an unsaturated, thermosetting, crosslinked alkyd resin.

* * * * *